(12) United States Patent
Spear (10) Patent No.: US 9,481,045 B2
(45) Date of Patent: Nov. 1, 2016

(54) TIG WELDING SYSTEM

(71) Applicant: LINCOLN GLOBAL, INC., City of Industry, CA (US)

(72) Inventor: Theresa Spear, Highland Heights, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 312 days.

(21) Appl. No.: 14/179,831

(22) Filed: Feb. 13, 2014

(65) Prior Publication Data

US 2015/0076129 A1   Mar. 19, 2015

Related U.S. Application Data

(60) Provisional application No. 61/878,081, filed on Sep. 16, 2013.

(51) Int. Cl.
| | |
|---|---|
| *B23K 9/067* | (2006.01) |
| *B23K 9/095* | (2006.01) |
| *B23K 9/10* | (2006.01) |
| *B23K 9/09* | (2006.01) |
| *B23K 9/167* | (2006.01) |

(52) U.S. Cl.
CPC .............. *B23K 9/067* (2013.01); *B23K 9/09* (2013.01); *B23K 9/0953* (2013.01); *B23K 9/1062* (2013.01); *B23K 9/167* (2013.01)

(58) Field of Classification Search
CPC ........ B23K 9/09; B23K 9/091; B23K 9/092; B23K 9/095; B23K 9/0953; B23K 9/073; B23K 9/0731; B23K 9/0735; B23K 9/10; B23K 9/1006; B23K 9/1043; B23K 9/1056; B23K 9/1062; B23K 9/067
See application file for complete search history.

(56) References Cited

U.S. PATENT DOCUMENTS

| | | | |
|---|---|---|---|
| 4,527,045 A | 7/1985 | Nakajima | |
| 6,008,470 A * | 12/1999 | Zhang ................... | B23K 9/092 219/130.31 |
| 8,513,568 B2 | 8/2013 | Kawamoto et al. | |
| 2005/0173390 A1* | 8/2005 | Lanouette .............. | B23K 9/095 219/130.21 |
| 2008/0083705 A1 | 4/2008 | Peters | |
| 2009/0173726 A1* | 7/2009 | Davidson ............. | B23K 9/0956 219/130.01 |

(Continued)

FOREIGN PATENT DOCUMENTS

| | | |
|---|---|---|
| EP | 1 815 935 A1 | 8/2007 |
| WO | WO 2011/114679 A1 | 9/2011 |

*Primary Examiner* — Brian Jennison
(74) *Attorney, Agent, or Firm* — Perkins Coie LLP (57) ABSTRACT

A TIG welding system is provided including a power source having a controller in communication therewith, the controller having a memory storing at least one waveform; a welding torch including an electrode electrically connected to the controller, the electrode having a length and a diameter; an amperage input in communication with the controller and adapted to receive a user-selected welding amperage; wherein in the controller is programmed to select one of the at least one waveform based on the user-selected amperage and apply power from the power source to the electrode according to the selected at least one waveform; wherein the at least one waveform includes an arc initiation stage including at least one pulse, wherein during the arc initiation stage, the controller is configured to prevent user control of an arc current or voltage, wherein upon attaining a steady state at the user-selected welding amperage, the controller is configured to permit user control of the arc current or voltage applied to the electrode.

20 Claims, 8 Drawing Sheets

(56) References Cited

U.S. PATENT DOCUMENTS

| | | | |
|---|---|---|---|
| 2009/0261073 A1 | 10/2009 | Mui | |
| 2009/0321401 A1* | 12/2009 | Peters | B23K 9/091 219/137 PS |
| 2011/0049116 A1* | 3/2011 | Rappl | B23K 9/1087 219/132 |
| 2011/0163072 A1 | 7/2011 | Vogel | |
| 2012/0145690 A1 | 6/2012 | Kawamoto et al. | |
| 2013/0092672 A1 | 4/2013 | Peters et al. | |

* cited by examiner

TIG WELDING SYSTEM

This application claims priority to and the benefit of U.S. Provisional Patent Application 61/878,081, filed on Sep. 16, 2013.

TECHNICAL FIELD

In general, the present invention relates to a tungsten inert gas (TIG) welding system. More particularly, the present invention relates to a TIG welding system having an automatic parameter set for TIG start and control consistency.

BACKGROUND OF THE INVENTION

Welding systems reside at the core of the modern industrial age. From massive automobile assembly operations to automated manufacturing environments, these systems facilitate joining in ever more complicated manufacturing operations. Hot or cold wire welding processes a wire or electrode being heated (e.g., via current) and received by a puddle created by a main heat source (e.g., plasma arc, tungsten inert gas (TIG) welding, metal inert gas (MIG) welding, flux core, laser, among others).

Additionally, welding may involve, raising, cladding, building up, filling, hard facing, overlaying, joining, and other welding applications. When confronted with a workpiece having a curved surface, an orbital welding processes may be used to rotate the welding head to apply a weld to the curved surface. The most common examples, where orbital welding is used, is the welding of pipe. Pipe welding may include thin wall application where the welding head is rotated about the other surface two piece ends being joined together, alternatively, pipe welding may include deep grove geometries where the welding electrode extends into a grove formed between the two pipes being joined to lay down successive beads of weld material to fill the grove the join the thick walled pipes. Orbital welding systems may include a welding head that is mounted on a guide track or a fixture that clamps or is otherwise supported on the workpiece and rotated to supply a weld. With orbital welding often involves limited visibility of a welding zone with lead cameras and/or trailing cameras.

Considering the use of TIG welding, TIG welding may be used in various welding operations including the orbital welding and non-orbital welding, manual welding or automated welding operations. TIG welding employs a tungsten electrode. A number of standard electrode sizes are used ranging from 0.020" to 5/32" with the 1/16" and 3/32" being the most commonly used electrode diameters. To establish stable arc, a user will adjust current/voltage amplitude, duration, frequency amperage and in alternating current (AC) welding the ratio of positive to negative pulse to tune the arc based on the electrode being used. A key stage in TIG welding is the initiation of the arc. Tuning the multiple parameters identified above for arc initiation is difficult because of the number of variables available to the user.

SUMMARY OF THE INVENTION

In accordance with an embodiment of the present invention, a TIG welding system is provided including a power source having a controller in communication therewith, the controller having a memory storing at least one waveform; a welding torch including an electrode electrically connected to the controller, the electrode having a length and a diameter; an amperage input in communication with the controller and adapted to receive a user-selected welding amperage; wherein in the controller is programmed to select one of the at least one waveform based on the user-selected amperage and apply power from the power source to the electrode according to the selected at least one waveform; wherein the at least one waveform includes an arc initiation stage including at least one pulse, wherein during the arc initiation stage, the controller is configured to prevent user control of an arc current or voltage, wherein upon attaining a steady state at the user-selected welding amperage, the controller is configured to permit user control of the arc current or voltage applied to the electrode.

In accordance with another embodiment of the present invention, a method of controlling a TIG welder including receiving an amperage input; selecting a waveform from a memory based on the amperage input, the waveform including parameters extrapolated according to the amperage input, the waveform including an arc initiation stage and a sequencing stage; energizing an electrode according to the waveform; preventing user control of energy to the electrode during the arc initiation stage.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein:

FIG. 6 is a flow diagram illustrating control of the arc initiation stage according to the invention based on an a FIG. 4 is a diagram illustrating a welder system that adjusts an energizing of a welding wire based on detection of an edge on a workpiece;

FIG. 5 is a diagram illustrating a welding sequence that performs a weaving weld operation on a "V" groove on a workpiece;

DETAILED DESCRIPTION OF THE INVENTION

Embodiments of the invention relate to methods and systems that relate to a power source for a welding operation that includes plural pre-programmed waveforms. One of the pre-programmed waveforms is selected based on an amperage input by the user.

"Welding" or "weld" as used herein including any other formatives of these words will refer to depositing of molten material through the operation of an electric arc including but not limited to submerged arc, GMAW, MAG, MIG, TIG welding, or any electric arc used with an orbital welding system. "Electrode" as used herein describes a conventional electrode, consumable electrode, non-consumable electrode for various arc processes as well as optics to deliver and focus (or defocus) a laser beam light source for the purpose of forming a puddle on a workpiece.

The best mode for carrying out the invention will now be described for the purposes of illustrating the best mode known to the applicant at the time of the filing of this patent application. The examples and figures are illustrative only and not meant to limit the invention, which is measured by the scope and spirit of the claims. Referring now to the drawings, wherein the showings are for the purpose of illustrating an exemplary embodiment of the invention only and not for the purpose of limiting same, FIGS. 1-6 illustrates a welding system that is used with a manual, automated or semi-automated welding system. One illustrative example of a welding system is a Tungsten Inert Gas (TIG) or Gas Tungsten Arc Welding (GTAW) welding.

FIGS. 1-6 illustrate an example embodiment of a TIG welding system 100 (also referred to as welder, system, welding system, and/or welder system). Welding system 100 includes a welding power source and a controller. The controller may be made part of the power source 110 or be a remote controller such as a pendant or other remote device for operator control. When a remote controller is used, communication between the remote controller and the welder may be made in any known wired or wireless form of communication. In the example shown, controller 160 is carried within a housing with the power source of welder 100. The subject innovation can be used with any welding operation that includes an arc and a hot or cold wire that is liquefied to deposit welding material onto a workpiece.

Controller 160 may be any suitable controller including a programmable logic controller or computer based controller. To provide additional context for various aspects of the present invention, the following discussion is intended to provide a brief, general description of a suitable computing environment in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and/or software. Generally, program modules include routines, programs, components, data structures, etc., that perform particular tasks or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices. For instance, a remote database, a local database, a cloud-computing platform, a cloud database, or a combination thereof can be utilized with processing component.

The controller 160 can utilize an exemplary environment for implementing various aspects of the invention including a computer, wherein the computer includes a processing unit, a system memory and a system bus. The system bus couples system components including, but not limited to the system memory to the processing unit. The processing unit may be any of various commercially available processors. Dual microprocessors and other multi-processor architectures also can be employed as the processing unit.

The system bus can be any of several types of bus structure including a memory bus or memory controller, a peripheral bus and a local bus using any of a variety of commercially available bus architectures. The system memory can include read only memory (ROM) and random access memory (RAM). A basic input/output system (BIOS), containing the basic routines that help to transfer information between elements within controller 160, such as during start-up, is stored in the ROM.

Controller 160 can further include a hard disk drive, a magnetic disk drive, e.g., to read from or write to a removable disk, and an optical disk drive, e.g., for reading a CD-ROM disk or to read from or write to other optical media. Controller 160 can include at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media, which may be referred to simply as memory 165, includes, but is not limited to, RAM, ROM, EEPROM, flash memory or other memory technology, CD-ROM, digital versatile disks (DVD) or other magnetic storage devices, or any other medium which can be used to store the desired information and which can be accessed by controller 160.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, Radio Frequency (RF), Near Field Communications (NFC), Radio Frequency Identification (RFID), infrared, and/or other wireless media. Combinations of any of the above should also be included within the scope of computer readable media.

A number of program modules may be stored in the drives and RAM, including an operating system, one or more application programs, other program modules, and program data. The operating system in controller 160 can be any of a number of commercially available operating systems.

In addition, a user may enter commands and information into the computer through a keyboard and a pointing device, such as a mouse. Other input devices may include a microphone, an IR remote control, a track ball, a pen input device, a joystick, a game pad, a digitizing tablet, a satellite dish, a scanner, or the like. These and other input devices are often connected to the processing unit through a serial port interface that is coupled to the system bus, but may be connected by other interfaces, such as a parallel port, a game port, a universal serial bus ("USB"), an IR interface, and/or various wireless technologies. A monitor (e.g., display 115), or other type of display device, may also be connected to the system bus via an interface, such as a video adapter. Visual output may also be accomplished through a remote display network protocol such as Remote Desktop Protocol, VNC, X-Window System, etc. In addition to visual output, a computer typically includes other peripheral output devices, such as speakers, printers, etc.

A display (in addition or part of display 115) can be employed with controller 160 to present data that is electronically received from the processing unit. For example, the display can be an LCD, plasma, CRT, etc. monitor that presents data electronically. Alternatively or in addition, the display can present received data in a hard copy format such as a printer, facsimile, plotter etc. The display can present data in any color and can receive data from controller 160 via any wireless or hard wire protocol and/or standard. In another example, controller 160 and/or system can be utilized with a mobile device such as a cellular phone, a smart phone, a tablet, a portable gaming device, a portable Internet browsing device, a Wi-Fi device, a Portable Digital Assistant (PDA), among others.

The computer can operate in a networked environment using logical and/or physical connections to one or more remote computers, such as a remote computer(s). The remote computer(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet.

When used in a LAN networking environment, the computer is connected to the local network through a network interface or adapter. When used in a WAN networking environment, the computer typically includes a modem, or is connected to a communications server on the LAN, or has other means for establishing communications over the WAN, such as the Internet. In a networked environment, program modules depicted relative to the computer, or portions thereof, may be stored in the remote memory storage device. It will be appreciated that network connections described herein are exemplary and other means of establishing a communications link between the computers may be used.

Alternatively or in addition, a local or cloud (e.g., local, cloud, remote, among others) computing platform can be utilized for data aggregation, processing, and delivery. For this purpose, the cloud computing platform can include a plurality of processors, memory, and servers in a particular remote location. Under a software-as-a-service paradigm, a single application is employed by a plurality of users to access data resident in the cloud. In this manner, processing requirements at a local level are mitigated as data processing is generally done in the cloud, thereby relieving user network resources. The software-as-a-service application allows users to log into a web-based service (e.g., via a web browser) which hosts all the programs resident in the cloud.

In an example, a plurality of users can access a local or cloud database (e.g., local database, cloud database, remote database, among others) computing platform (e.g., controller 160) via a web-based application on a computing device, such as a tablet, pad, laptop, cell phone, computer, or other component. The web-based application can allow a user to configure particular reports that quantify data in substantially any format and in comparison to any number of metrics, such as performance benchmarks and the like. Moreover, the software applications can be updated and distributed in a global fashion to insure that each user is using the latest and greatest technology.

In accordance with an aspect of the invention, controller 160 includes an amperage input 170. The amperage input 170 may be any digital or analog input including but not limited to a knob, a slider, a toggle, push buttons, numerical keypad, +/−keys, or touch screen that allows the user to directly input a desired amperage or select from a range of amperage values or plural pre-set amperage values. Controller 160 includes a memory component 165 that stores one or more waveforms that used in the welding process. Based on the amperage input by the user or a default amperage when no amperage is selected, the controller selects a waveform to be generated by the power source for the welding operation or a portion thereof. For example, the waveform may vary depending on the stage of the welding process. Typically for TIG welding, the power source initially undergoes a high frequency stage that leads to an arc initiation stage. Once the arc is successfully initiated, the power source enters a welding sequencing stage. Focusing on the arc initiation stage, based on the user selected or default amperage, an arc initiation waveform is determined. The waveform includes but is not limited to the current/voltage pulse amplitude, pulse duration, pulse frequency, pulse polarity and positive negative pulse ratio (for AC welding), and how it transitions into the starting current (SC) which is the start of the sequencing stage. Since these parameters are pre-programmed or extrapolated for a given amperage, the user does not have to fine tune these parameters to conduct the welding operation. In accordance with one aspect of the invention, the controller prevents user input of the current/voltage or other input that would control the energy to the electrode during the arc initiation stage so that control of the arc initiation phase is exclusive to the controller. This greatly simplifies the set up process for the user allowing the user to focus on conducting the welding operation.

Figure 3:
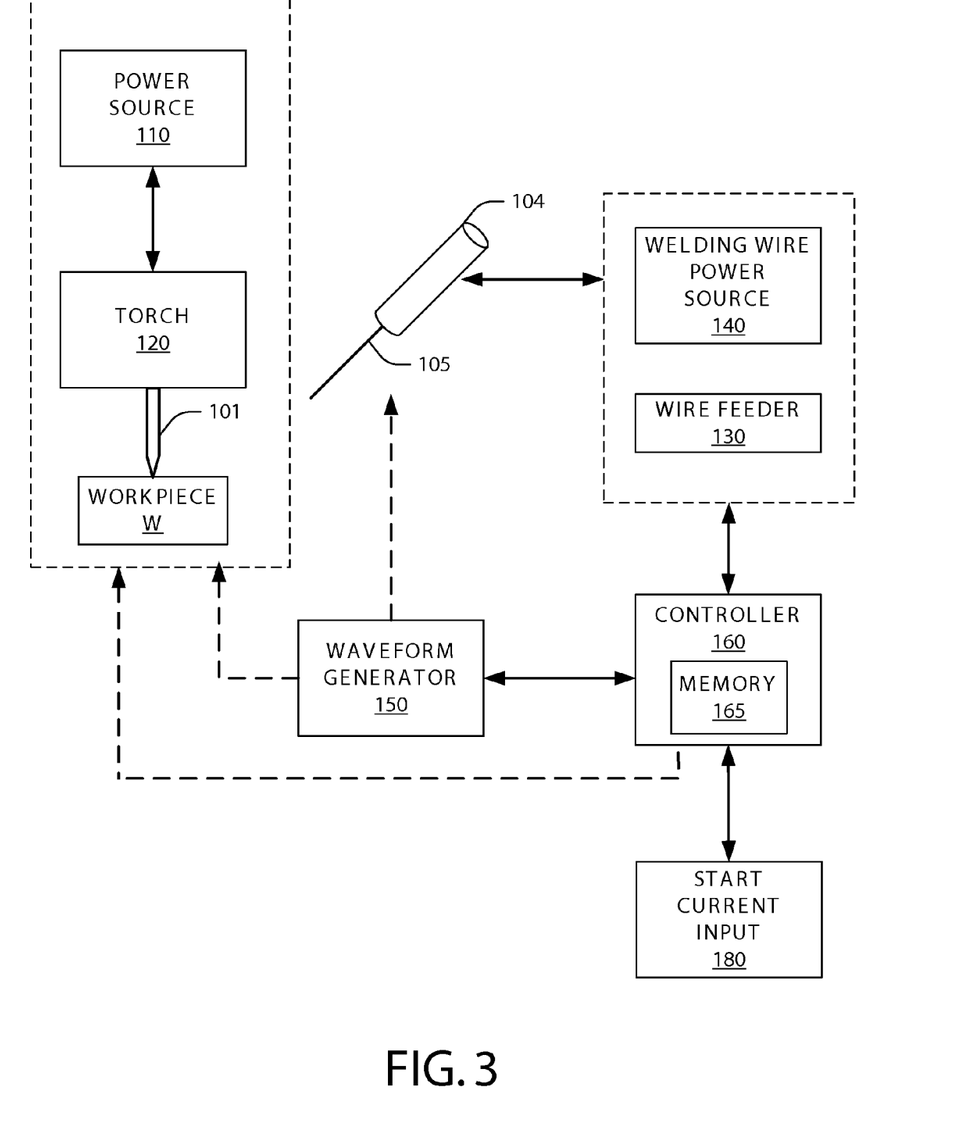
FIG. 3 is a schematic view of a welding system according to one embodiment of the invention.
Figure 5:
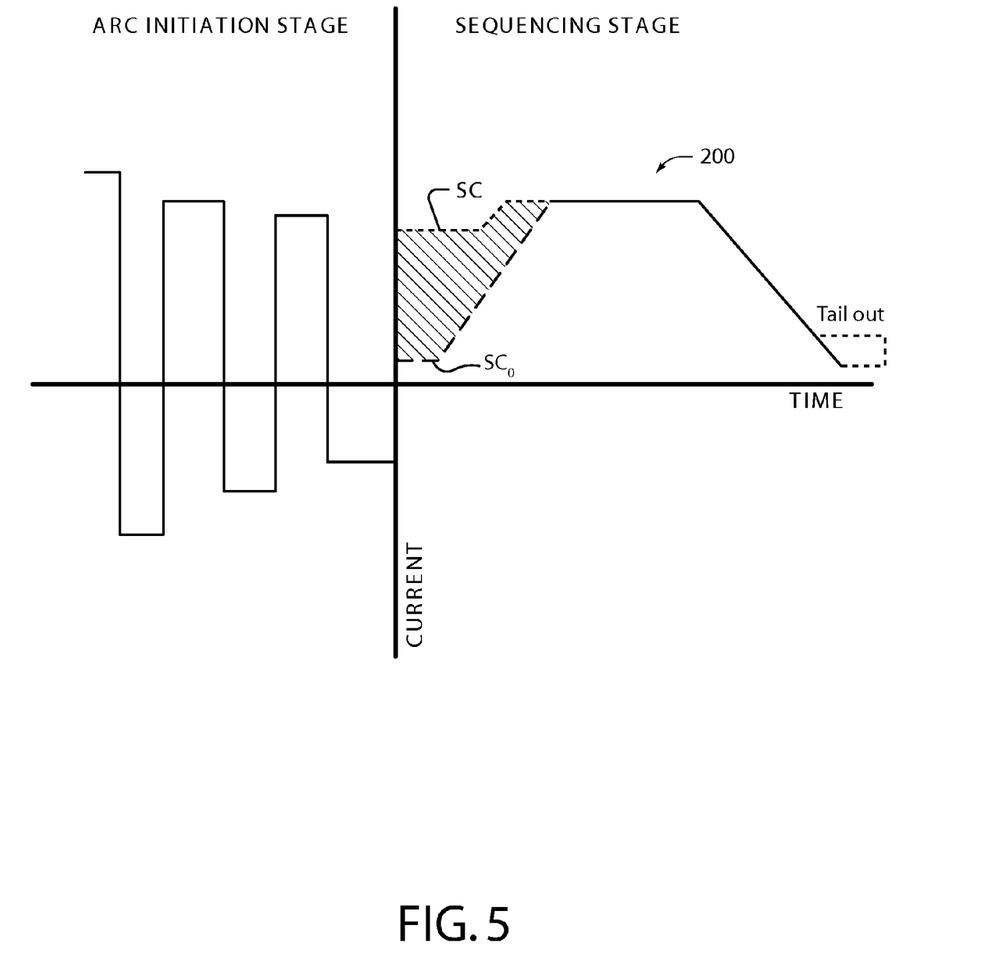
FIG. 5 is a graph depicting one embodiment of a wavefrom according to the invention during an arc initiation stage.

According to another aspect of the invention, the user may input a desired level of the start current for the welding operation. As shown in FIG. 3, a start current input 180 is provided to communicate the desired start current to the controller 160. The start current is applied by the controller to the set the start current during the sequencing stage of the welding operation as best shown in FIG. 5. Preceding the sequencing stage, the power to the electrode is typically ramped down to a very low level i.e. less than 2 amps, before the sequencing stage begins. The dashed line in FIG. 5 represents an existing sequencing stage, where the sequencing stage includes a very small start current SCE (near 0). The sequencing stage in this case is symmetrical with the waveform ramping up from low to start current to the steady state current SSC and then ramping down to a tail out (for terminating) current. According to the invention, a predetermined minimum starting current that is associated with user selected or dialed welding current will limit the allowable start current (SC) range. This is important to transition the established arc into the welding current smoothly. It also continues the energy flow efficiently. The waveform line transitions from an arc initiation stage ramping up or down to the desired start current SC. In the example shown, current pulses in the arc initiation stage that are ramped down with progressively smaller pulse heights until reaching the desired start current. Once the desired start current SC is achieved, the waveform 200 transitions to a sequencing stage. As shown, sequencing stage starts from the set start current SC and ramps up to a steady state current until termination, which includes a ramp down to near 0 current. The dashed line existing waveform ramps up from user dialed low start current SCE resulting in a longer cycle time to deliver the energy/power to the weld pool than the sequencing stage of the current inventions. In the example shown, the difference in energy/power delivered between an existing system with a start current SCE and the start current SC of the invention is shown at shaded area. In addition, the present invention allows full control of the tail down from steady state operation. As indicated in the dashed line example, a symmetrical waveform is required in existing applications such that if a higher starting current were used, the tail down would be back to the starting current value. The present invention provides a ramp down that is controlled independent of the start current SC, allowing the tail down to levels other than that of the start current. For example, as shown, tail out may occur at a level less than the start current level including but not limited to a near zero level as shown. The tail out down to the near zero amps is used in the example to minimize crater and to prevent cracks occurring in the weld.

Figure 1:
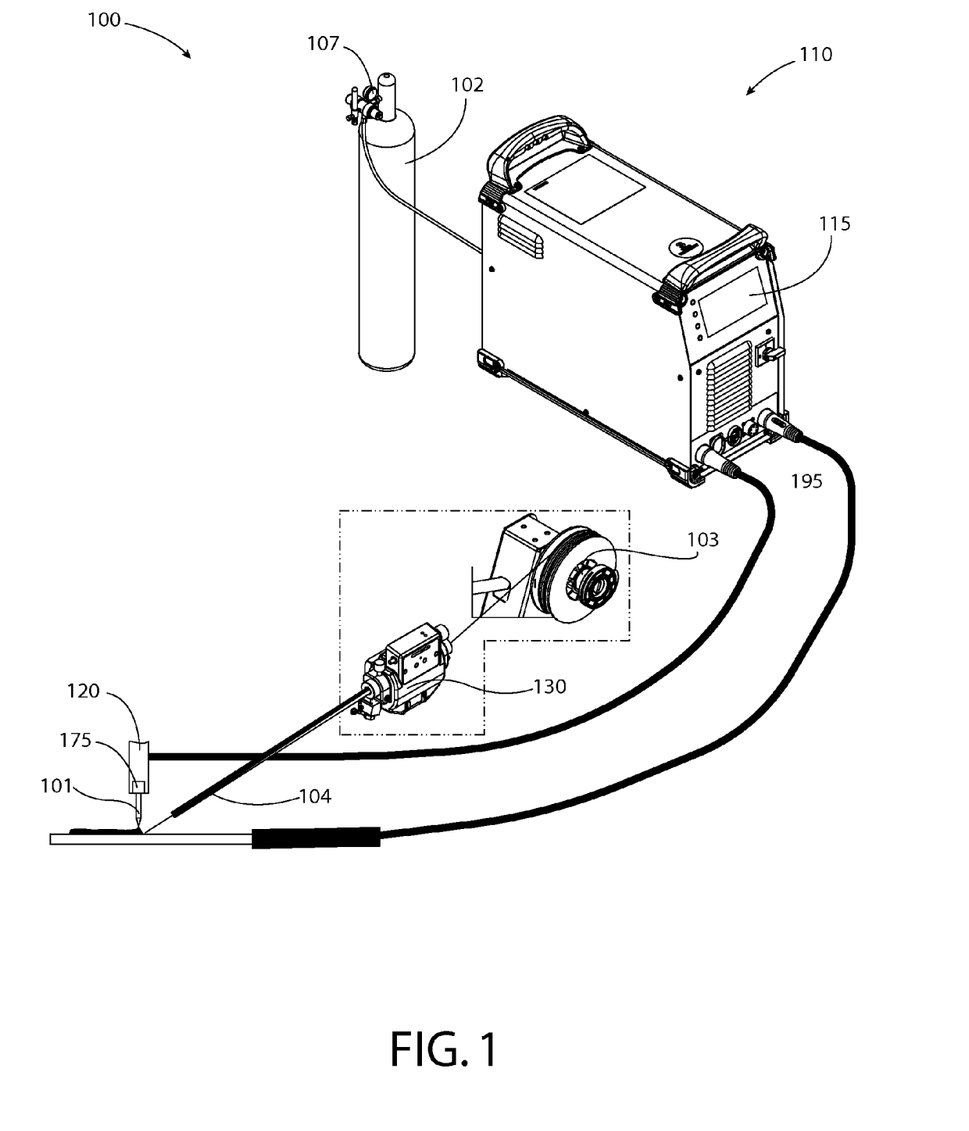
FIG. 1 is a partially schematic perspective view of a welding system according to the invention.
Figure 2:
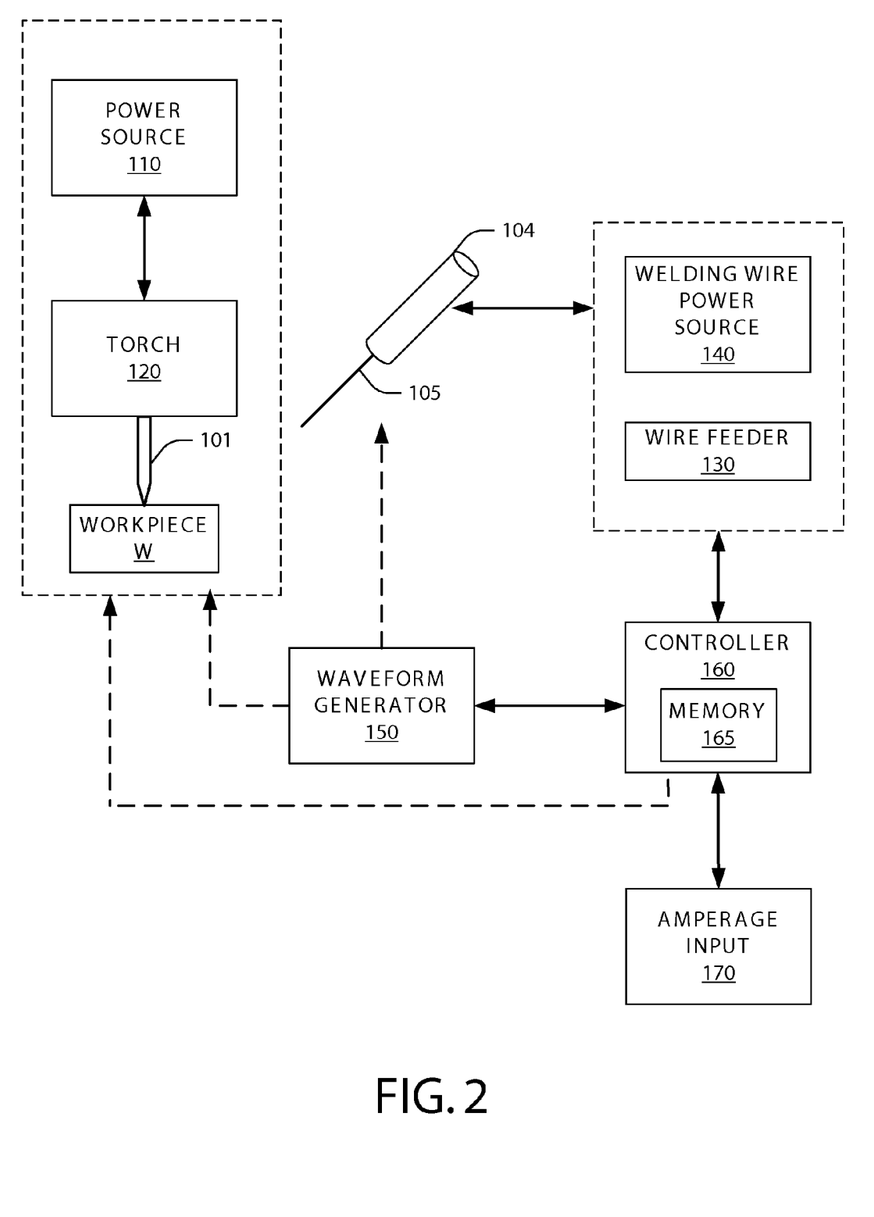
FIG. 2 is a schematic view of a welding system according to one embodiment of the invention.

The controller 160 of the invention takes the start current SC input by the user at 180 and uses this as a remote minimum current in a two step mode, and the welding current as the remote max current initially. Once the starting state is elapsed the user will have full control of the remote potentiometer, for example in a foot pedal, to control the current during welding. As shown in FIG. 5, waveform 200 may include a pre-flow period where the arc is maintained at the start current while the flow of shield gas from gas source 102 is started. After the pre-flow period, the arc may ramp up to a welding current and control is transitioned from the system controller 160 to a user operated control 195, such as a foot pedal, remote potentiometer, or a knob, as shown in FIG. 1. After the welding process is complete, the system controller 160 may resume control by transferring control of the arc current away from the user operated control 195 to the waveform 200 selected by controller 160. At this point, waveform includes a tail out or ending current where the current is ramped down toward a selected low value. The low value may be a value near zero independently selected by the users or other value selected according to the quality performance of the machines offers. Controller 160 may then execute a post-flow stage where shielding gas continues to flow for a period that reduces the likelihood of weld contamination by maintaining the shield gas flow until the weld cures. A minimum tail out current will be separate from the set start current. The minimum current for the tail out can be as low as the welding machine allows.

By presetting a minimum starting current according to the set welding current, the arc initiation process will first go through the starting sequence with reasonable preset current to prevent novice users from having difficulty to stabilize the arc. Subsequently, the current will be ramped up or down to the starting current in an optimized time frame. This current is treated as the minimum current for the user operated controller 195 only at the initial state of sequencing stage. After this state, the user controls the current with the user operated controller 195 until reaching tail out, which is controlled by controller 160.

With reference to FIG. 1, welding system 100 is a TIG welder having a welding torch, generally indicated at 120 electrically connected to a power source 110. Torch 120 may include a tungsten electrode 101 and consumable wire 105 that are used to deposit weld material to form a weld joint on workpiece W. Electrode 101 may have a length suitable for the given welding application, and thus any suitable length may be selected. Likewise, the diameter of the electrode may be selected from standard size electrodes, which typically range from 0.020" to 5/32" or custom diameters may be selected. The user may select an appropriate size (diameter) electrode for AC or DC welding operations based on the selected amperage. It is understood that selecting an electrode of too great a diameter for a given amperage may cause the arc to rotate around the tip, while too small of a diameter may cause the arc to vaporize/destroy the tungsten electrode. Optionally, electrode diameter may be input by the user or detected by the controller to provide an indication of whether the electrode is suitable for the selected amperage. For example, after the user selects an amperage and prior to arc initiation, controller may provide an indicator to the user that the electrode is or is not suitable for the selected amperage. The indicator may be any audible, visual, or tactile cue, or a combination thereof. For example, an indicator LED may be green when the electrode is appropriately sized for the selected amperage or red if it is not a suitable size.

Welding torch 120 is connected to a shield gas supply 102, that provides an inert gas, such as Argon gas, to welding torch 120. Welding gas supply 102 may include a container, such as a cylinder, that stores shield gas S under pressure, and delivery of shield gas S, via appropriate tubing or other conduits, may be controlled by a regulator or other controller 107. A non-pressurized source may be used also with gas delivery provided by a pump or the like. When welding thick plates or heavy wall pipes, the weld joint design typically provides a narrow groove to permit an elongated electrode to be placed in the joint with some adjustment of the torch angle to assure a good weld created by layering a series of weld beads upon each other until the joint is filled. This process may be referred to as narrow groove welding or deep groove welding interchangeably throughout the following description. Narrow groove welding is a process where successive single bead weld layers are applied on top of one another in a narrow groove or joint. One of the considerations in the narrow groove environment is maintaining sufficient shield gas to protect the molten weld puddle from atmospheric contamination. Typically, an inert shield gas, such as Argon, is provided from outside the weld joint with a long electrode extending into the groove below the shield gas supply.

The welder may include a wire feeder connected to a supply of welding wire, such as a spool 103 that provides tungsten wire W to one or more wire guides 104. In the example shown, a pair of extended wire guides 104 are provided and fed by a spool 103 or other suitable supply of consumable wire.

System 100 includes a controller 160 that is configured to control a welding parameter related to system 100 in order to adjust an energizing of welding electrode 101. In general, the welding parameter can be adjusted by controller 160 based on an input from the user. For instance, according to one embodiment of the invention (FIG. 2) an amperage is pre-selected by the user. To that end, an amperage input component 170 is provided to receive the user's input. As discussed, amperage input component may be any means of providing an amperage value to controller 160 including but not limited to a knob, slider, lever, or other mechanical device for selecting an amperage within a pre-selected range or series of amperage values, a numerical keypad, +/− selector, or other device for entering a specific amperage value, or combinations thereof.

Figure 4:
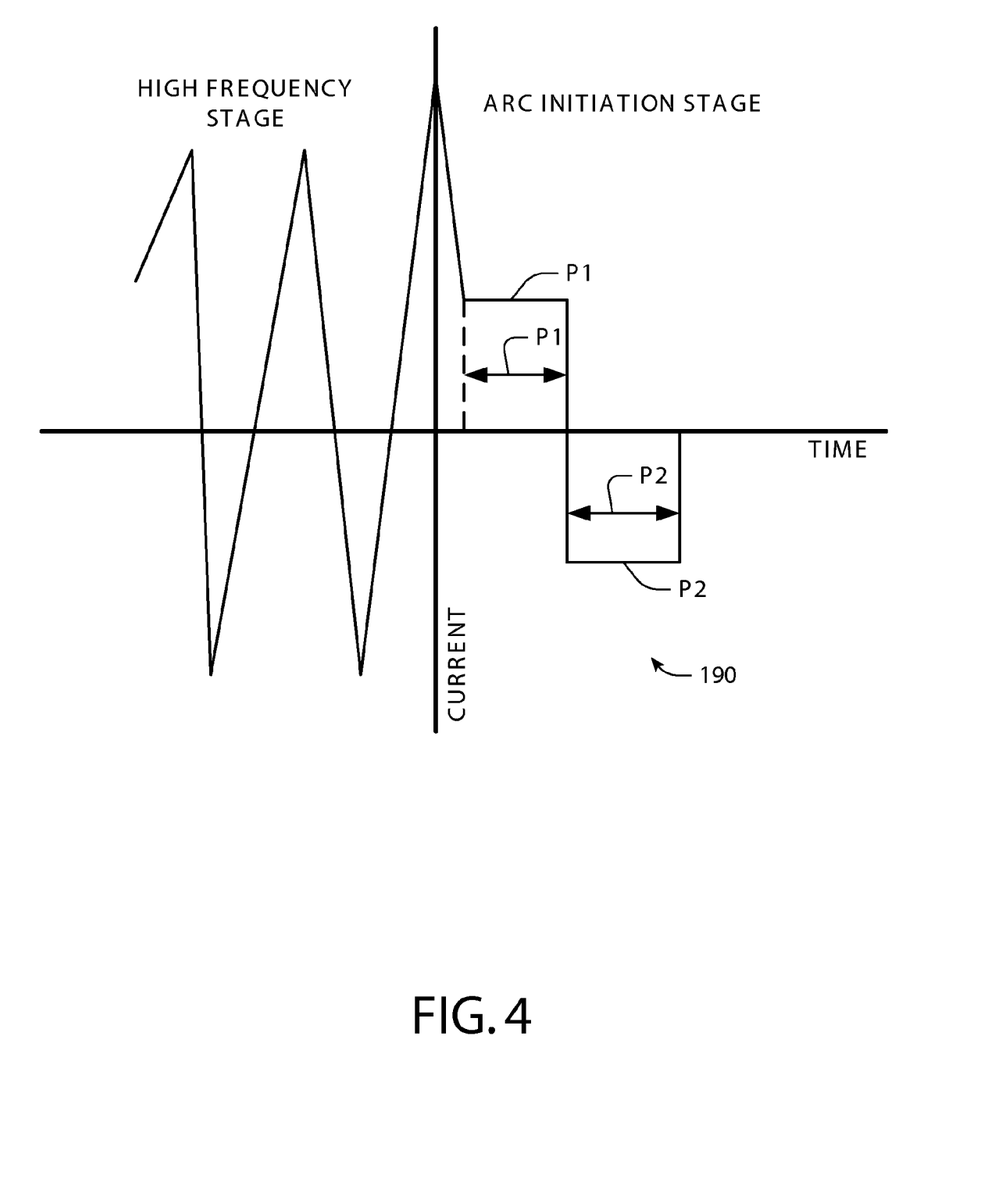
FIG. 4 is a graph depicting one embodiment of a wavefrom according to the invention during an arc initiation stage.

By way of example and not limitation, the welding parameter can include selection of a waveform based on the selected amperage and energizing of welding electrode 101 based on the selected waveform. As will be understood, the waveform incorporates parameters including pulse height, duration, polarity, frequency and, when using AC current, a ratio between the positive and negative pulses. These parameters may vary depending on the stage of the welding operation. Typical stages include a high frequency pre-arc initiation stage, arc initiation, and sequencing stage. FIG. 4 depicts one example waveform selected for an arc initiation stage based on a 300 amp input. Waveform 190 in this example is for an AC welding operation with a first pulse P1 that is positive and a second pulse P2 that is negative. The pulse duration or pulse width for first pulse is D1 and the duration of second pulse is shown at D2. Waveform 190 provides a pre-set ratio between the positive and negative duration of pulses. This ratio may be a 1 to 1 ratio when the positive and negative pulse duration is equal or an unequal value when either the positive or negative duration value is larger than the other value. In the example shown, the first pulse duration is longer than the second pulse duration resulting in a positive to negative ratio that is greater than 1 to 1. Positive to negative ratios less than 1 can be used as well. The waveform shown is just one example. It will be appreciated that waveforms may be developed by trial and error and programmed into memory 165 of controller 160.

According to the invention using the selected welding current (amp input 170), a narrower range of welding electrode sizes may be derived. The starting parameters are calculated by controller 160 according to the pre-selected amperage. This includes the restrike number and duration, arc initiation, current pulse amplitude and duration, and how pulses are tapered down or ramp up to the start current value for sequencing stage and tail out current along with the post flow. This ensures that the arc starts stably and yet softly so that the work piece W is not subjected to burn through.

A plurality of waveforms may be stored in memory 165 and correspond to selected amperage values or ranges of amperages may be defined for a selected waveform such that controller 160 selects a waveform to be communicated to the electrode 101 based on an amperage value provided by the user. Optionally, if the user fails to select an amperage, a default amperage may be defined or selected based on feedback from other input devices. For example, as discussed, the electrode diameter may be monitored by a diameter sensor 175 in communication with controller 160 or the diameter of electrode 101 may be input to the controller 160 by user. In these instances, controller 160 may select a default amperage based on the diameter of electrode 101. Once the amperage is obtained, controller 160 provides a pre-set waveform based on the selected amperage to apply power to the electrode 101 according to the waveform.

As shown, controller 160 may communicate with a waveform generator 150 to select the waveform and energize electrode 101. In accordance with another embodiment of the invention, a selected start current may be provided. The selected start current may be pre-set by controller based on the amperage input 170 according to one embodiment. Alternatively, the start current may be selected by the user as shown in FIG. 3. To that end, controller 160 may be in communication with a start current input component 180. As best shown in FIG. 5, the start current SC selected by the controller of the user input may be greater than the low value (less than 2 amps or near zero) typically used by existing devices so that upon entering the sequencing stage, waveform provides early delivery of energy to the weld pool or puddle. This also allows the transition from the arc initiation stage to the sequencing stage to be more stable since the magnitude of the pulse height transition from arc initiation to the start current is reduced. According to another aspect of the invention, the start current is less than the welding amperage or weld current. As a result, subsequent to reaching the start current, waveform provides a further transition from the start current to the weld current. As shown in FIG. 5, this may include ramping up to the weld current after a steady state start current is attained.

It is to be appreciated that controller 160 can adjust one or more welding parameters alone or in combination. Additional parameters may be adjusted and/or monitored by controller 160 including but not limited to wire feed speed, any weave or other motion of the torch, puddle temperature and the like. Therefore, the control of parameters discussed should not be considered limiting in terms of the ability of the controller 160 to control other parameters.

It is to be appreciated and understood that system 100 can include various configurations and embodiments and the configuration in system 100 is not to be limiting on the subject innovation. Wire feeder 130 can be a stand-alone component (as depicted), incorporated into welding wire power source 110, controller 160, or other component of system 100 It is to be appreciated that welding wire power source 140 and power source 110 can be separate sources a single power source, or a combination thereof. Controller 160 can be a stand-alone component, incorporated into power source 110, incorporated into torch 120, or component of system 100.

Figure 6:
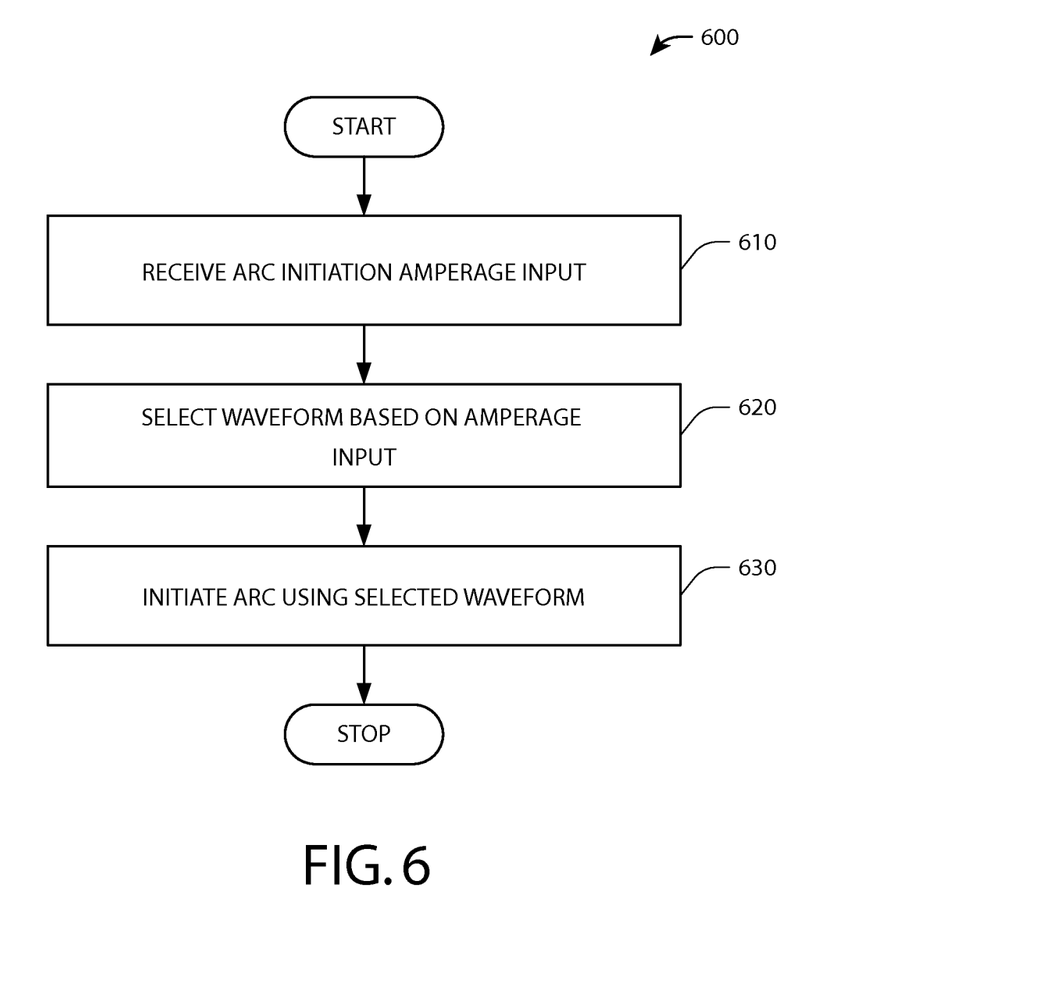
FIG. 6 is a flow diagram of selecting a waveform for arc initiation based on an input amperage.
Figure 7:
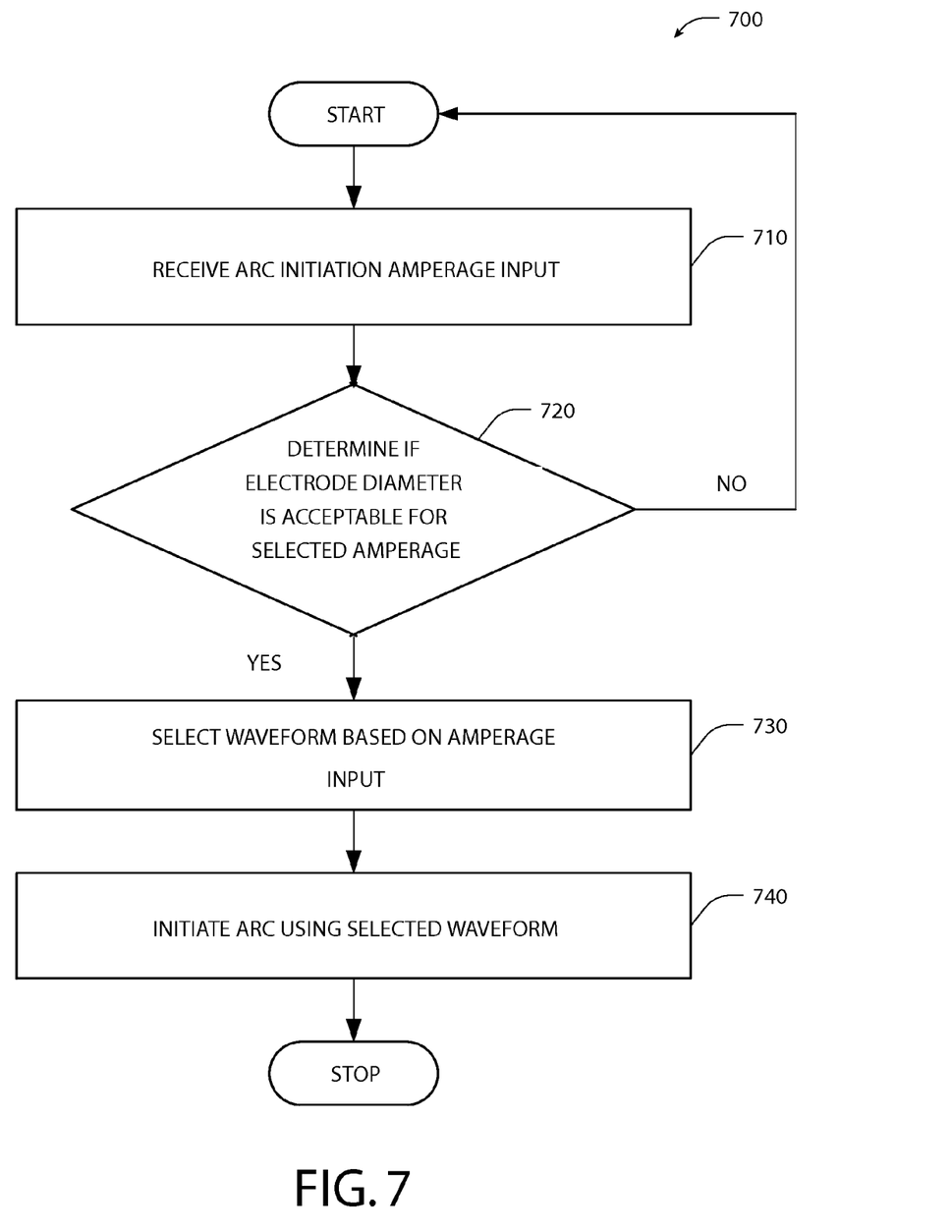
FIG. 7 is a flow diagram of selecting a waveform for arc initiation based on an input amperage after determining whether the electrode and input amperage are suitable for arc initiation.
Figure 8:
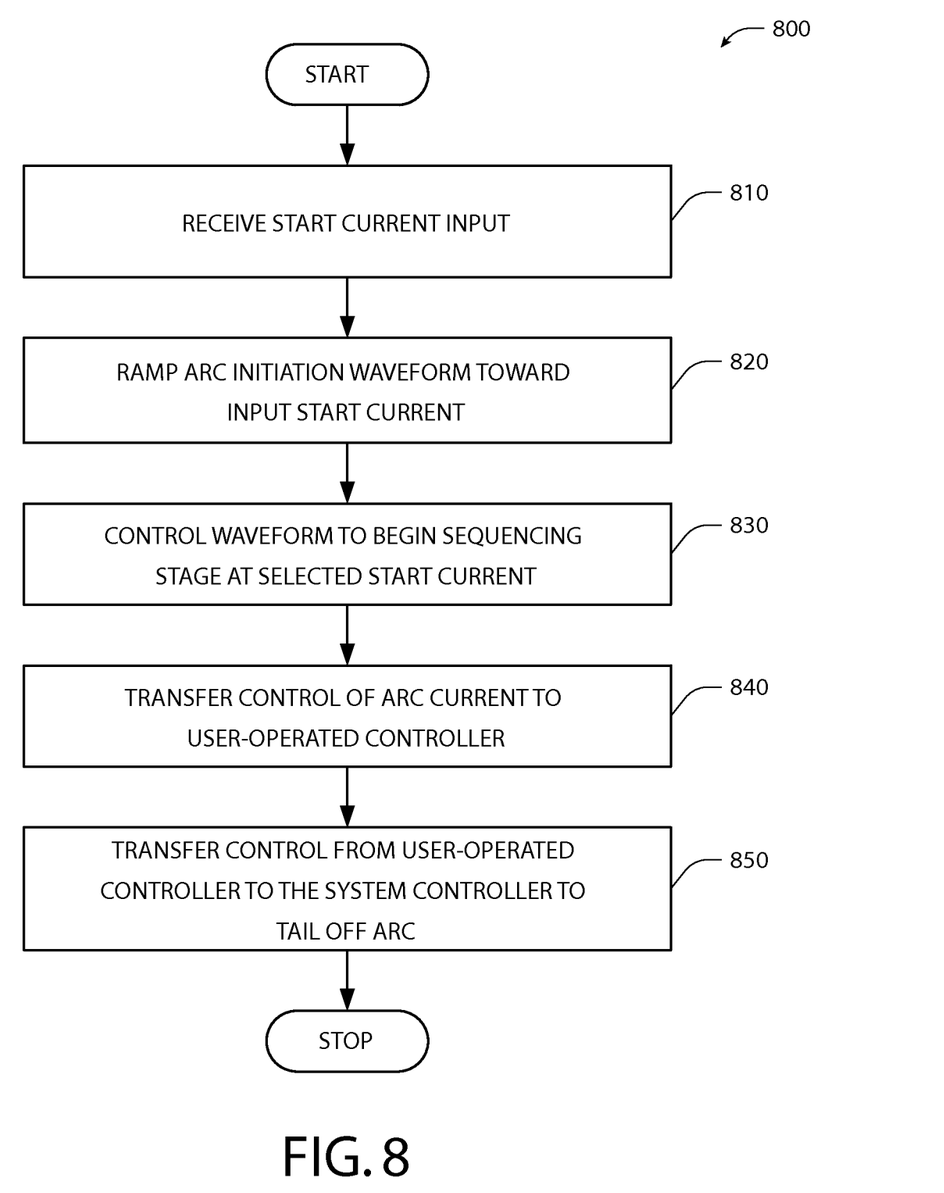
FIG. 8 is a flow diagram of controlling the sequencing stage of a welding operation based on an input start current for the sequencing stage.

In view of the exemplary devices and elements described supra, methodologies that may be implemented in accordance with the disclosed subject matter will be better appreciated with reference to the flow charts and/or methodology of FIGS. 6-8. The methodologies and/or flow diagrams are shown and described as a series of blocks, the claimed subject matter is not limited by the order of the blocks, as some blocks may occur in different orders and/or concurrently with other blocks from what is depicted and described herein. Moreover, not all illustrated blocks may be required to implement the methods and/or flow diagrams described hereinafter.

Sequentially, the following occurs as illustrated in the decision tree flow diagram 600 of FIG. 6 which is a flow diagram 600 that provides control of an energizing of a welding electrode based on an amperage input by the user for arc initiation. Accordingly, an amperage input 170 for arc initiation is received from user at 610 via an input to controller 160. Controller 160 selects at least one waveform from a plurality of waveforms stored in memory 165 at 620, and initiates the arc at electrode 101 using the selected waveform 630. Optionally, as discussed above, a check may be put in place to determine whether the electrode diameter and input amperage are suitable. As shown in FIG. 7, after receiving the input amperage at 710, based on feedback from an electrode diameter sensor 175 or input from the user, controller 160 may determine whether the electrode diameter and input amperage are suitable for each other. If not, an indicator may be issued at 725 to alert the user that the electrode and amperage are not suitably matched allowing the user to reselect the amperage or change the electrode diameter. If the electrode and amperage are suitable, controller 160 selects at least one waveform from a plurality of waveforms stored in memory 165 based on the input amperage at 730, and initiates the arc with the selected waveform at 740.

According to another aspect of the invention, control of the start of the sequencing stage may be based on a selected start current input by the user. However, the range of the actual starting current SC is determined by the welding current. Flow diagram in FIG. 8 illustrates one possible series of steps for implementing this aspect of the invention. As discussed above, use of a start current input for the sequencing stage may stand alone or be used in combination with the arc initiation current input discussed above. A start current input component is provided and a start current input is received at 810. Based on the input start current, controller 160 transitions from an arc initiation stage to the sequencing stage at 820 by ramping the arc initiation pulses toward the start current. Controller 160 maintains control of the current waveform to begin the sequencing stage at the selected start current at 830. After the sequencing stage commences, at 840, controller transfers control of arc current to a user operated controller, which may be a remote controller, like a foot pedal and the like, allowing the user to control the current to the electrode 101 during the welding operation. At the conclusion of the welding operation 850, control is transferred from the user operated controller to the system controller 160 to tail off the arc. Controller 160 ramps the arc down to a near 0 level or other level that is able to produce sound weld or acceptable according to the appropriate standards. As previously indicated, when control is transferred from the user operated controller, the system controller assumes exclusive control and does not permit user input.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A TIG welding system comprising:
a power source having a controller in communication therewith, the controller having a memory storing at least one waveform, the at least one waveform including an arc initiation stage and a sequencing stage;
a welding torch including an electrode electrically connected to the controller, the electrode having a length and a diameter; and
an amperage input in communication with the controller and adapted to receive a user-selected welding amperage; wherein the controller is programmed to select one of the at least one waveform based on the user-selected welding amperage and apply power from the power source to the electrode according to the selected at least one waveform;
wherein the at least one waveform includes a transition from the arc initiation stage to the sequencing stage, the arc initiation stage including at least one pulse,
wherein the arc initiation stage includes an arc initiation waveform that is selected by the controller from a plurality of arc initiation waveforms, the arc initiation waveform in the arc initiation stage corresponding to the user-selected welding amperage.

2. The TIG welding system of claim 1, wherein the at least one waveform includes a start current greater than 2 amps and less than the welding amperage to provide early delivery of power to a weld pool, and wherein during the arc initiation stage, the at least one waveform includes a transition from an arc initiation current to the start current to start the sequencing stage, wherein during the sequencing stage, the at least one waveform transitions from the start current to the welding amperage.

3. The TIG welding system of claim 2, wherein the arc initiation stage includes plural pulses, and wherein the transition includes plural pulses, each having a pulse height, wherein the pulse height of each is progressively reduced until reaching the start current.

4. The TIG welding system of claim 1, wherein the arc initiation waveform includes a pulse height parameter, and a pulse duration parameter.

5. The TIG welding system of claim 4, wherein the arc initiation waveform further includes a positive to negative pulse ratio.

6. The TIG welding system of claim 5, wherein the positive to negative pulse ratio is less than 1.

7. The TIG welding system of claim 1 further comprising a sensor adapted to detect the diameter of the electrode, the sensor being in communication with the controller; wherein the controller determines whether the electrode diameter and the user-selected amperage are compatible before applying power to the electrode.

8. The TIG welding system of claim 1, wherein the amperage input includes an arc initiation amperage.

9. The TIG welding system of claim 1, wherein the at least one waveform further includes a sequencing stage, the sequencing stage having a start current, wherein the at least one waveform transitions from the arc initiation stage to the sequencing stage by tapering one or more pulses following the at least one pulse of the arc initiation stage toward the start current, wherein the start current is not equal to the welding amperage.

10. The TIG welding system of claim 9 further comprising a start current input in communication with the controller, wherein the start current input establishes the start current for the sequencing stage of the at least one waveform.

11. The TIG welding system of claim 8, wherein during the sequencing stage, the controller transfers control of the arc current or voltage to a user operated controller.

12. The TIG welding system of claim 11 wherein within the sequencing stage, the at least one waveform further includes a tail down portion, where control of the arc current or voltage is transferred from the user-operated controller to the controller, and the controller is configured to prevent user control of the arc current or voltage during the tail down portion, and wherein during the tail down portion, the at least one waveform reduces the current to a selected low value.

13. The TIG welding system of claim 12, wherein the selected low value is less than two amps.

14. A method of controlling a TIG welder comprising:
receiving an amperage input;
selecting, by a controller, a waveform from a memory based on the amperage input, the waveform including parameters extrapolated according to the amperage input, the waveform including an arc initiation stage and a sequencing stage, wherein the arc initiation stage includes an arc initiation waveform that is selected by the controller from a plurality of arc initiation waveforms, the arc initiation waveform in the arc initiation stage corresponding to the amperage input; and
energizing an electrode according to the waveform, wherein the waveform includes a transition from the arc initiation stage to the sequencing stage, the arc initiation stage including at least one pulse.

15. The method of claim 14, wherein the parameters include an amplitude, a duration, and a restrike number of the at least one pulse.

16. The method of claim 15, wherein the waveform includes a start current greater than 2 amps and less than the amperage input, wherein the parameters further include a pulse taper profile to the start current.

17. The method of claim 15, wherein the parameters further include a tail out current and post flow.

18. The method of claim 14 further comprising receiving a start current input and, wherein the arc initiation waveform transitions from the arc initiation stage current to the start current to begin the sequencing stage.

19. The method of claim 18, wherein the transition includes tapering the amplitude of the at least one pulse downward and upward toward the start current.

20. The method of claim 19 wherein during the sequencing stage, the at least one waveform ramps from the start current to a welding current corresponding to the amperage input, and wherein upon attaining the welding current, the controller permits user control of the energy to the electrode.

* * * * *